3,069,463
EXTRACTION OF 2,7-NAPHTHALENE DICARBOXYLIC ACID FROM ITS ISOMERS WITH GAMMA-PICOLINE
Peter Fotis, Jr., Highland, Ind., assignor to Standard Oil Company, Chicago, Ill., a corporation of Indiana
No Drawing. Filed Oct. 26, 1959, Ser. No. 848,503
8 Claims. (Cl. 260—525)

The present invention relates to the extraction of 2,7-naphthalene dicarboxylic acid from a mixture of isomers of naphthalene dicarboxylic acid, and more particularly concerns the use of gamma picoline as a selective solvent for this purpose.

An object of the present invention is to provide a method for removing 2,7-naphthalene dicarboxylic acid from its mixture with isomers thereof. Another object is to provide a method for removing 2,7-naphthalene dicarboxylic acid from mixtures thereof with 2,6-naphthalene dicarboxylic acid. A further object is to provide a method for recovering a valuable, relatively pure 2,7-naphthalene dicarboxylic acid isomer for use in condensation reactions with glycols and the like to form a polyester product having a melting point substantially higher than the melting point of a polyester product prepared from a mixture of naphthalene dicarboxylic acid isomers. Other objects will be apparent from the following disclosure.

2,7-naphthalene dicarboxylic acid occurs in admixture with its isomers and particularly with 2,6-naphthalene dicarboxylic acid, for example, in a product from the oxidation of isomers of dimethyl naphthalenes to naphthalene dicarboxylic acids. The separation of the dimethyl naphthalenes before oxidation is extremely difficult. Further, the 2,7-naphthalene dicarboxylic acid isomer cannot readily be separated from its isomers after oxidation by distillation and is not readily separable from its isomers by known solvent extraction systems, particularly in substantially pure form. In using naphthalene dicarboxylic acids as reactants in the preparation of polyesters, it is often desirable to use a pure isomer such as the 2,7-naphthalene dicarboxylic acid in order to obtain a polyester product having a high melting point. Polyesters formed from mixtures of the naphthalene dicarboxylic acid isomers will not possess the high melting property of a polyester prepared from a substantially pure isomer. I have provided a new method for the separation of 2,7-naphthalene dicarboxylic acid from isomers thereof and more particularly from mixtures of isomers containing 2,6-naphthalene dicarboxylic acid. In my method, the 2,7-naphthalene dicarboxylic acid is separated by selective extraction with gamma-picoline. The naphthalene dicarboxylic acid isomers are solids under normal conditions and the gamma-picoline selectively dissolves the 2,7-naphthalene dicarboxylic acid while rejecting isomers thereof as a solid raffinate. In accordance with my process, a mixture of isomers containing 2,7-naphthalene dicarboxylic acid is contacted with gamma-picoline and a liquid extract and solid raffinate phases are formed. The extract phase is then separated from the solid raffinate phase. The gamma-picoline may be removed from the extract phase by distillation, extraction, or other means leaving a solid residue product. The residue product is a substantially pure 2,7-naphthalene dicarboxylic acid and can be further washed with a convenient solvent such as, for example, water or a low molecular weight alcohol, if desired, to remove any remaining contaminating amounts of gamma-picoline or other undesired materials.

Gamma-picoline is a colorless liquid at room temperature, has a density of 0.9613 g./ml. (at atmospheric pressure and 4° C.), and a boiling point of 143.1° C. It is miscible with water, ethanol, ethyl ether, and the like.

The extraction process of this invention may be carried out at any temperature below the boiling point of gamma-picoline. The preferred temperature range for the extraction process is from about −10° to about 50° C. although much higher and lower temperatures may be used. The preferred range advantageously includes ambient and room temperatures.

The ratio of gamma-picoline to the total mixture to be extracted must be sufficient to exceed the solubility of gamma-picoline in the total mixture undergoing separation in order to form a distinct liquid phase containing gamma-picoline and 2,7-naphthalene dicarboxylic acid and a distinct solid phase containing the 2,6-naphthalene dicarboxylic acid and little if any solvent. Generally, between 1 and 100 or more parts by weight of gamma-picoline per part by weight of 2,7-naphthalene dicarboxylic acid may be used for the separation. For economical considerations, it is preferred to use from 1–50 parts by weight of gamma-picoline and advantageously less than 20 parts by weight of gamma-picoline because of the expense involved in handling large volumes of solvents.

The following examples illustrate the extraction process of this invention.

*Example I*

As an illustration of the high selectivity of the separation of 2,7-naphthalene dicarboxylic acid from an isomer thereof using gamma-picoline or the extracting solvents, 15 ml. of gamma-picoline were added to a 50 ml. flask containing 0.6 g. of a 50–50 mixture of 2,6- and 2,7-naphthalene dicarboxylic acids. The resulting mixture was stirred and allowed to stand for ½ hour. The mixture was then filtered to remove undissolved solid. The undissolved solid was dried and weighed (weight: 0.4 g.) and was analyzed and found to contain both 2,6- and 2,7-naphthalene dicarboxylic acids. The filtrate from the filtration step was evaporated under vacuum to remove the gamma-picoline and a 0.2 g. solid white crystalline produce was recovered from the evaporation. The infrared spectra of the solid product was identical to the spectra of a pure 2,7-naphthalene dicarboxylic acid.

*Example II*

As an illustration of the specific ability of the gamma isomer of picoline to selectively dissolve 2,7-naphthalene dicarboxylic acid, solubility tests were made to determine the solubilities of 2,6- and 2,7- naphthalene dicarboxylic acids in beta- and gamma-picolines. Each isomer was added in amounts of 0.1 g. to 20 ml. of each of the beta- and gamma-picolines with the results recorded below:

| Run | Naphthalene dicarboxylic acid isomer | Solvent | Results |
|---|---|---|---|
| 1 | 2,6 isomer | Beta picoline | Soluble. |
| 2 | 2,7 isomer | do | Do. |
| 3 | 2,6 isomer | Gamma picoline | Insoluble. |
| 4 | 2,7 isomer | do | Soluble. |

As can be seen from Example I, the present process is useful in extracting or separating a substantially pure 2,7-naphthalene dicarboxylic acid from admixture with the 2,6 isomer. Example II indicates the specific and unexpected ability of the gamma isomers of picoline as a solvent in the present extraction process for selective separation of isomers. As can be seen from the table of Example II, the beta-picoline dissolved both the 2,6 and 2,7 isomers demonstrating an inability to separate the isomers while the gamma-picoline dissolved only the 2,7 isomer.

Of course, it is intended that any feed material containing the 2,7-naphthalene dicarboxylic acid may be extracted to separate that acid in substantially pure form. For example, an effluent from an oxidation process wherein alkyl aromatics containing dimethyl naphthalenes are oxidized with chemical oxidizing agents such as chromic acid, a permanganate or nitric acid or with molecular oxygen, generally air, or in the presence of an oxidation catalyst such as, for example, the heavy metal oxidation catalysts or preferably the combination of bromine promoted heavy metal oxidation catalysts as taught in U.S. Patent No. 2,833,816, may be extracted with gamma-picoline to remove 2,7-naphthalene dicarboxylic acid. As a more particular illustration, an oxidation product predominating in naphthalene dicarboxylic acids obtained (from the oxidation of a 500 to 505° F. distillation cut of alkyl aromatics) is extracted with about 50 parts by weight of gamma-picoline per part by weight of 2,7-naphthalene dicarboxylic acid. 2,7-naphthalene dicarboxylic acid is extracted by the gamma-picoline in a liquid phase which may be separated from the solid phase residue. In this manner, the gamma-picoline may be used to extract the 2,7 isomer in substantially pure form while rejecting isomers thereof and other extraneous components including oxidation catalyst, etc. Such catalytic oxidation products may also contain unreacted dimethyl naphthalenes or reaction intermediates due to partial oxidation, and the gamma-picoline may be used to selectively separate the 2,6-naphthalene dicarboxylic acid from its isomers even in the presence of such other components.

Although, because of the high purity of the 2,7-naphthalene dicarboxylic acid separated by the present process, counter solvents or cosolvents are unnecessary, it may be desirable at times to employ such counter solvents or cosolvents. The counter solvents or cosolvents may be useful in increasing the efficiency of the gamma-picoline, or increasing the selective rejection of the 2,6 isomer or other isomer of 2,7-naphthalene dicarboxylic acid during the separation process. Counter solvents or cosolvents may be particularly advantageous, for example, when operating with very small amounts of gamma-picoline or when operating outside the preferred temperature range. Use of such counter solvents and cosolvents in extraction systems is well known in the art and it is fully intended that such use is contemplated herein.

It is evident from the foregoing that I have provided a highly selective separation process for separating 2,7-naphthalene dicarboxylic acid from isomers thereof using gamma-picoline as the extractant. My process is particularly useful in separating 2,7-naphthalene dicarboxylic acid from admixture with 2,6-naphthalene dicarboxylic acid such as occurs in mixtures of isomers resulting from the oxidation of mixtures of dimethyl naphthalenes.

I claim:

1. The method for extracting a mixture consisting essentially of 2,7-naphthalene dicarboxylic acid and at least one isomer thereof, comprising selectively extracting said mixture at a temperature below the boiling point of gamma-picoline with an amount of gamma-picoline sufficient to exceed the solubility of gamma-picoline in said mixture and form a distinct liquid extract phase and separating the liquid extract phase.

2. The method of claim 1 wherein the mixture which is extracted with said gamma-picoline is produced by oxidizing a mixture containing dimethyl naphthalenes in the presence of an oxidation catalyst.

3. The method of claim 1 wherein the mixture contains 2,6-naphthalene dicarboxylic acid.

4. The method for extracting a mixture consisting essentially of 2,7-naphthalene dicarboxylic acid and 2,6-naphthalene dicarboxylic acid comprising treating said mixture at a temperature below the boiling point of gamma-picoline with an amount of gamma-picoline sufficient to exceed the solubility of gamma-picoline in said mixture and form distinct liquid extract and solid raffinate phases, separating said liquid phase from sad solid phase, and removing said gamma-picoline from said liquid phase whereby a solid residue is formed essentially containing 2,7-naphthalene dicarboxylic acid in the substantial absence of 2,6-naphthalene dicarboxylic acid.

5. The method for extracting 2,7-naphthalene dicarboxylic acid from a mixture thereof with 2,6-naphthalene dicarboxylic acid, comprising contacting said mixture with from about 1 to about 50 parts by weight of gamma-picoline per part by weight of 2,7-naphthalene dicarboxylic acid at a temperature in the range of from about $-10°$ to about 50° C., separating the resulting liquid phase from the resulting solid phase, distilling gamma-picoline from said liquid phase, washing the resulting solid residue from the distilling step with water, and recovering the washed solid residue as substantially pure 2,7-naphthalene dicarboxylic acid.

6. The method of claim 5 wherein said mixture comprises about equal volumes of 2,7-naphthalene dicarboxylic acid and 2,6-naphthalene dicarboxylic acid.

7. The method of claim 1 wherein said temperature is in the range of from about $-10°$ to about 50° C.

8. The method of claim 1 wherein said amount of gamma-picoline is at least 1 part by weight per part by weight of 2,7-naphthalene dicarboxylic acid in said mixture.

No references cited.